United States Patent
Abrosimov

(10) Patent No.: US 6,806,817 B2
(45) Date of Patent: Oct. 19, 2004

(54) MEANS AND METHOD OF DATA ENCODING AND COMMUNICATION AT RATES ABOVE THE CHANNEL BANDWIDTH

(75) Inventor: Igor Anatolievich Abrosimov, St. Petersburg (RU)

(73) Assignee: Acuid Corporation (Guernsey) Limited (GB)

( * ) Notice: Subject to any disclaimer, the term of this patent is extended or adjusted under 35 U.S.C. 154(b) by 0 days.

(21) Appl. No.: 10/656,143

(22) Filed: Sep. 8, 2003

(65) Prior Publication Data

US 2004/0047413 A1 Mar. 11, 2004

Related U.S. Application Data

(63) Continuation-in-part of application No. PCT/IB03/00356, filed on Jan. 29, 2003.

(30) Foreign Application Priority Data

Feb. 1, 2002 (GB) .............................................. 0202366

(51) Int. Cl.[7] .............................................. H03M 5/08
(52) U.S. Cl. .............................. 341/53; 341/58; 341/52
(58) Field of Search .............................. 341/50, 53, 51, 341/52, 106, 60, 61, 95, 58, 56

(56) References Cited

U.S. PATENT DOCUMENTS

| 4,864,303 | A | * | 9/1989 | Ofek | 341/95 |
| 6,311,239 | B1 | * | 10/2001 | Matthews | 710/66 |
| 6,469,645 | B2 | * | 10/2002 | Coene | 341/59 |

* cited by examiner

Primary Examiner—Brian Young
Assistant Examiner—John B Nguyen

(57) ABSTRACT

The present invention relates to a coding apparatus for encoding data represented by 8 bit input symbols into 12 bit output codes for serially transmitting the codes along a communication channel, the codes being represented in the channel by signals having a limited minimum and maximum pulse width and sampled by a receiver at each receiver's clock period. The invention reduces artifacts introduced by sending data at a higher payload rate than the bandwidth of the communication channel, such as the voltage and current offsets introduced in the data at the receiver as a function of the preceding data.

20 Claims, 1 Drawing Sheet

MEANS AND METHOD OF DATA ENCODING AND COMMUNICATION AT RATES ABOVE THE CHANNEL BANDWIDTH

CROSS-REFERENCE TO RELATED APPLICATIONS

This application is a Continuation-in-Part of a PCT application PCT/IB03/00356 filed on 29 Jan. 2003 claiming priority of U.S. application Ser. No. 10/079,260 filed on 21 Feb. 2002 and GB application 0202366.1 filed on Feb. 1, 2002.

TECHNICAL FIELD

The present invention relates to the communication of signals, in particular, to the transmission and reception of digital signals. More specifically, the present invention relates to encoding and decoding the data being sent to guarantee the minimum and maximum pulse width of the signal taking 12 bits per signal when the data payload rate is above the bandwidth of the channel.

The present invention is particularly applicable to interfaces between integrated circuits and for high speed communications, such as currently addressed by Asynchronous Transfer Mode (ATM), 10 Gigabit Ethernet, PCI Express, RapidIO, Hyperchannel and Fibre Channels, and makes possible yet higher data rates for a particular bandwidth of the transmission medium or to increase the maximum channel length or reduce the bit error rate.

BACKGROUND OF THE INVENTION

As the operating frequency of complex digital communication and data transfer systems increases, one of major technical challenge has been to improve the data transmission when the data rate is about or exceeds the bandwidth of a communication channel. A conventional communication channel comprising a differential driver, such as an LVDS (Low Voltage Differential Signaling) driver, a production package for the integrated circuit such as a BGA (Ball Grid Array), a printed circuit board, a receiver packaged similarly with its ESD (Electronic Static Discharge) structure, acts together as a filter.

The use of transmission codes to improve the received characteristics of the information is well known in the prior art.

For example, 8 b/10 b encoding is commonly used to ensure there are sufficient transitions present in the bit stream, i.e. having maximum pulse limited by 5 bit intervals, to make clock recovery possible, as in U.S. Pat. Nos. 4,420,234 and 4,486,739. The 8 bits are transmitted during 10 bit intervals, that is not efficient when the data rate is limited by the maximum frequency of the signal spectrum. Still, it is commonly used nowadays. One of the most advanced known for today coding scheme to achieve the higher data rate through the bandwidth limited channel is the one that converts 8-bit digital data into 14-bit digital modulation codes (the so-called EFM—eight-to-fourteen modulation), see, for example U.S. Pat. No. 4,988,999. The advantage is due to doubled pulse width which allows for the packing of 8 bits into 7 bit intervals having the same maximum frequency.

In our earlier U.S. application Ser. No. 10/079,260, filed 21, Feb. 2003, another approach is disclosed providing 8 to 13 coding scheme. According to this invention, one byte is coded by 13 bits so that in a serialised stream of data there are no single bit width pulses, such as . . . 0-1-0- . . . Typically, having 13 bits is sufficient to have more than 256 symbols to code one byte (8 bits) and extra command symbols. This is due to doubled pulse width which allows for the transmitting of 8 bits using 6,5 bit intervals having the same maximum frequency of the signal spectrum.

However, in this case, it would be evident that 12 bits would be insufficient because it gives only 233 symbols. Thus, there is a demand for further increasing the data rate, especially, in cases when a DC balance is not necessary, e.g. in chip-to-chip communications, to achieve transmitting of 8 bits using 6 bit intervals having the same maximum frequency of the signal spectrum.

BRIEF SUMMARY OF THE INVENTION

It is an object of the present invention to increase the maximum amount of data that can be communicated across a channel, in the case where the transmitter and receiver can operate at a frequency well above the bandwidth of the transmission medium but the transform or filter function imposed by the transmission medium distorts the signal such that it cannot be sampled reliably.

It is still another object of the invention to reduce the offset of the data from the sampling threshold that occurs as a function of the data pattern when the data rate exceeds the bandwidth of the channel.

In accordance with these and other objects, the present invention is a coding apparatus for coding data represented by input symbols into codes for transmitting the codes by a transmitter along a communication channel serially, the codes being represented in the channel by signals having a limited minimum and maximum pulse width, wherein the input symbols are encoded to have the minimum signal pulse width longer than one period of the receiver's sampling clock; the apparatus comprising:

a means for generating a coding table wherein two symbols are coded in conjunction with one another; the table comprising 466 symbols grouped into 233 pairs so that, within each pair, one symbol is complementary to another one, to obtain the coding table comprising only 233 symbols such that no one symbol is complementary to another symbol;

a means for partitioning the obtained coding table comprising 233 symbols into three groups of symbols, including:

a first group comprising one symbol only, wherein all bits are the same;

a second group comprising symbols in which two least bits are the same; and a third group comprising symbols in which the two least bits are opposite.

The code table may be reordered to provide the optimal coder implementation such as having minimal logical terms. For example, a modification of the table of the first embodiment gives a fast and elegant means to enable 8 bit input symbols encoding into 12 bit output codes. In this case, the constraints include: minimal pulse width is 2, maximal pulse width is 22, code word width is 12. An implementation of the coder/decoder means for a table corresponding to these requirements can be implemented as presented in Appendix A.

The example implementations of a coder and decoder are presented in appendices A and B in RTL (register transfer level) Verilog.

Using a similar technique, the number of coding combinations for 13 bit symbols with minimum pulse width 2 can be increased to the amount sufficient to code two 8 bit symbols with DC balance enhancement. A typical procedure including DC balance is described in detail in U.S. application Ser. No. 10/079,260 filed 21, Feb. 2002 by the same inventors, the specification of which application being incorporated herein by reference.

In still one more aspect of the invention, a communication apparatus is provided comprising a coding apparatus according to the first aspect of the invention, a serialiser, a communication channel, a deserialiser and a decoder.

A coding apparatus, or, coder as well as the decoding apparatus, or coder, can be implemented in hardware, such as a hub, switch, router, modem or processor, or in a CD, or disc driver, as well as in a logic element synthesised or created based on a table listing of the code alphabet. Alternatively, the coder or decoder may be implemented in a lookup table.

The code table may be splitted into subtables and an intermediate code may be computed from which the final code is determined.

In another aspect of the invention, a method of coding data represented by input symbols into codes for transmitting along a communication channel is provided using the coder of the first aspect of the invention.

In still another aspect of the invention, a communication system and a method of communication is provided including coding data represented by input symbols into codes, transmitting the codes along a communication channel, and receiving data, wherein the data are coded using a method of coding of the present invention.

Further, a method of decoding codes into respective output symbols is provided.

BRIEF DESCRIPTION OF THE SEVERAL VIEWS OF THE DRAWINGS

For a better understanding of the present invention and the advantages thereof and to show how the same may be carried into effect, reference will now be made, by way of example, without loss of generality, to the following description now taken in conjunction with the accompanying drawings in which.

Figure 1:
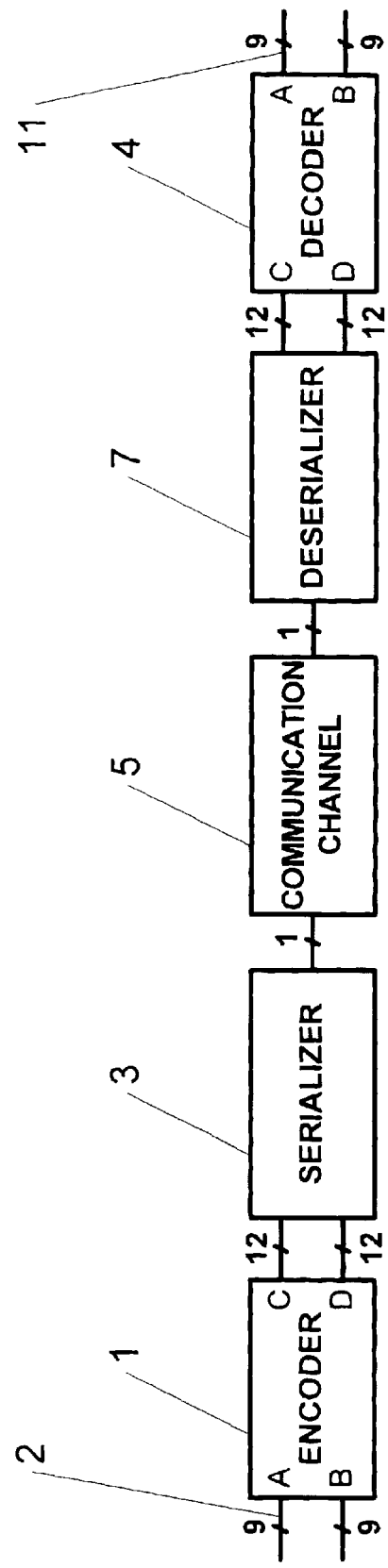
FIG. 1 shows a general block diagram of the communication channel employing the coding apparatus according to the present invention.

Reference will also be made to the following appendices:

Appendix A is a description of a preferred embodiment of coding apparatus shown FIG. 1 in the Verilog Hardware Description Language, from which actual circuitry can be synthesised using widely used CAD tools such as Ambit from Cadence, and which can be understood easily by a person skilled in the art of modern and high speed VLSI design, including a preferred code table for encoding data of 8 bits in length. An implementation of the decoder means for this coder is presented in Appendix B.

DETAILED DESCRIPTION OF THE INVENTION

In contemporary communication channels, the data can be viewed in an eye diagram. In this diagram the data moves from sample point to sample point, with changes in signal polarity at a point equidistant to the centre of the eyes of each sampling point. In the examples given earlier, this amounts to sending 6 GHz of data down a channel with 1 GHz bandwidth (BW).

The present invention reduces the pattern dependent shift of the data in each eye by coding the data to move from eye to eye such that instead of having the opportunity to change polarity between each eye, it must stay in a state for a given number of eyes, such as 2. The number of eyes is not reduced.

A detailed description of the invention will now be given, with reference to FIG. 1 illustrating a communication system in which an input data word 2 is encoded by encoder 1 to have special characteristics as described later, the encoded data is then presented to serialiser (transmitter) 3, sent through communication channel 5 into deserialiser (receiver) 7, then decoded in decoder 4 to produce a replica of the original data at output 11. In this system the transmitter and receiver can operate at higher sample or clock rates than the incoming data rate, but that data rate is still well above the bandwidth of channel 5.

The encoder 1 according to the present invention encodes the data 2 to use optimally the sampling rates available in the transmitter and receiver. Hitherto, if data is sent at a rate much higher than the channel bandwidth, for example at 6 times the channel bandwidth, then the impulse function of the channel causes the received signal to be offset and distorted such that it cannot be received reliably using a fixed threshold receiver. The function of the encoding means is to reduce the effect of the impulse or filtering function of the channel.

An example of a suitable encoder is given in Appendix A in the form of a hardware description in the Verilog language, from which a working encoder can be synthesised automatically using widely available CAD tools.

An example of a suitable decoder is given in Appendix B in the form of a hardware description in the Verilog language, from which a working decoder can be synthesised automatically using widely available CAD tools.

The first step in applying the present invention is to determine the requirements of the receiver, in particular, whether the code it requires must be DC balanced or not, and how many bit intervals, or clock cycles, can elapse without the signal changing, that is, the lower frequency limit, or the minimum number of transitions, of the received data. Means for doing this type of coding is well understood and widely used.

The next step, novel to the present invention, is to determine the ratio of the maximum data bandwidth that can be sent through the channel as a continuous repetitive tone, to the maximum data rate that can be supported by the channel given maximum irregularity in the data. For a channel, which can transmit a 6.5 GHz tone, a typical maximum data rate for data containing step changes is 3.25 GHz, a 2:1 ratio. This means that the data must remain constant for two sample periods, i.e. for two bit intervals, whenever it changes. This is distinct and different from simply sending the data at half the data rate: the data even at 3.25 GHz will have encoding, such as 8b/10b, so the useful data will be 20% lower than this, or 2.6 GHz of useful data (either 2.6 Gbps or 5.2 Gbps depending on whether the data is clocked on one edge only or on both edges). Moreover, the coding scheme that is described here uses all the eye transition points, so it uses the maximum capacity of the channel given these criteria.

Once the criteria are identified, the algorithm can be embodied in a C++ program which can be easily compiled by a specialist in the art as well as numerous obvious modifications of such a program to cover other code requirements, for searching for the minimum code length that meets all the criteria, and then searching for the maximum alphabet for that code length and code constraints.

For example, consider a channel where the minimum signal pulse width is two sample periods, or two bit intervals, and the minimum number of transitions of the signal is one per 22 bits; in other words, the constraints include: minimal pulse width is 2, maximal pulse width is 22, code word width is 12.

Thus, a suitable code table isreproduced in Appendix A. This particular table is preferred because it is the smallest table meeting the above requirements. This takes 8 bits of incoming data and expands it to 12 bits, which can be transmitted reliably through the 1 GHz BW channel under the conditions described above, namely where the receiver, channel compensation and calibration enables 3.25 GHz to be transmitted. In this case, if the data is clocked on both edges, then the data capacity without coding is 7 Gbps, which is 5.6 Gbps of useful data assuming that 8b/10b coding is used in the original channel. If the same data is applied to the 8b/12b coding scheme in Appendix A, then 8 Gbps of real data is transmitted, which is a 43% increase in the real data conveyed by the channel.

According to the invention, the coding table is generated wherein two symbols are coded in conjunction with one another; the table comprises 466 symbols grouped into 233 pairs so that, within each pair, one symbol is complementary to another one, to obtain the coding table comprising only 233 symbols such that no one symbol is complementary to another symbol.

Further, the obtained coding table comprising 233 symbols is split into three groups of symbols such that:

a first group comprises one symbol only, wherein all bits are the same;

a second group comprises symbols in which two least bits are the same;

a third groups comprises symbols in which the two least bits are opposite.

Preferably, the coding table is compiled so that the most significant bit (MSB) is "0".

In the embodiment of the invention, the above described table will have 1 symbol in the first group, 143 symbols in the second group and 89 symbols in the third group. The order of symbols within each group can be changed to optimise the amount of logic required, or for some other purposes.

Further, the order of the above groups in the table can be changed arbitrary.

Preferably, the groups are arranged as described above, i.e., the first group is followed by the second and the second is followed by the third group.

The process of coding two input symbols, A and B, into two outputs symbols, C and D, using the above described table, is further described in detail.

Let us define, in a pair of two symbols, that the symbol transmitted first will be referred as C and the symbol transmitted second will be referred as D.

Than, the first rule is that the bits of symbol D shall be transmitted through the channel serially in the order opposite to the order of bits when transmitting symbol C.

This rule is conditioned by the necessity of transmitting the symbol C which can be from the first group or from the second group, followed by a second symbol D from the second group having any polarity but being within the requirements for a minimum pulse width on symbol boundaries due to symbol C ends with two identical bits and symbol D starts from the two identical bits.

The following rules which shall be observed when compiling a coding table are as follows:

if symbol A is greater or equal to 36, and symbol B is also greater or equal to 36, than symbol C is taken from the above described coding table, under the number equal to A-35, while symbol D is taken from the same table under the number B-35; the polarity of the first bit of the symbol D coinciding with the polarity of the last bit of symbol C, so that there is no transition between symbols C and D;

if symbol A is less than 36, than symbol C is taken from the same table under the number A×4+(B modulo 2), while symbol D is taken from the same table under the number B/2, so that the code C is selected from the first or the second group only, while symbol D is also taken from the first or the second group only; wherein symbol D is transmitted complementary to symbol selected from the table, so that there is a transition between symbols C and D;

if symbol A is greater or equal to 36, but symbol B is less than 36, than, symbol C is taken from the same table under the number B×4+(A modulo 2)+2, while symbol D is taken from the same table under the number A/2, wherein symbol D is transmitted complementary to symbol selected from the table, so that there is a transition between symbols C and D.

The obtained pairs of C and D shall be further processed to avoid single bit interval pulse on the boundary of pairs. To achieve this, if the first bit of symbol C is opposite to the last bit of previously transmitted symbol D, the new symbols C and D are transmitted complementary. Thus, there is no transition between pairs of C and D.

Optionally, the further requirement can be fulfilled to reduce the maximum pulse width, as follows: when the two last bits in previous symbol D are the same, and the two first bits of the next symbol C are the same, than, the whole new pair C and D, shall be transmitted complementary further.

Thus, 268 input symbol combinations can be coded into 12-bit symbols C and D, which can be transmitted serially and have the minimal pulse width in a stream of bits equal to 2, the maximum being 22.

Once the code table has been generated, it is preferred to validate the table by running all possible variations of two adjacent input data words through the coder, through an extreme worst case HSPICE model of the driver, package with parasitics, pcb, any connectors including the via or connect hole model in the pcb, receiver package with parasitics, receiver ESD structure and receiver buffer, and then into the decoder. The encoder and decoder in this validation process is implemented preferably in a HDL, such as using the Verilog or VHDL languages, and confirm that the entire table meets the required objectives. This has been done for the code tables published here.

It is possible to use the above validation process to extend the length of an alphabet, by accepting code words that can validate but do not meet the design criteria. This is a method of generating the alphabet but is not preferred because variations in parasitics in the channel, and channel noise, can cause irregular and non-linear behaviour which will affect such alphabets very much more adversely than for alphabets which are developed using a program such as shown in Appendix B that are correct by construction.

Whilst the example embodiments have focused on a coder, it is obvious from their description and the Appendices, that the decoder is simply the inverse operation and the construction of this decoder, once the coder has been defined, is evident to anyone skilled in the art of digital system design.

The present invention solves a particular problem in a communication system where the transmitter and receiver can operate reliably at frequencies well above the bandwidth of the channel. The design of such systems is very complex and highly specialised, requiring the solution of a multitude of problems. Once that design solution is in place, the present invention allocates part of the performance of the transmitter and receiver to codes which apply some of the bandwidth of the transmitted data for overcoming bandwidth deficiencies in the channel medium and interconnect. The present invention thus reduces the total number of real data bits that are received, compared with a channel which simply sends the data and samples it at the receiver. However, given that a transmitter and receiver with the required performance can be designed an implemented as is now the case with contemporary activities, the present invention allows more real data to be communicated in the case where the sampling rate exceeds the channel bandwidth by a multiple of two or more.

I claim:

1. A coding apparatus for encoding data represented by input symbols into codes for serially transmitting the codes along a communication channel, the codes being represented in the channel by signals having a limited minimum and maximum pulse width and sampled by a receiver at each receiver's clock period, wherein the 8 bit input symbols are encoded into a 12 bit output codes to have the minimum signal pulse width longer than one period of the receiver's sampling clock, the coding apparatus comprises:

a means for generating a coding table wherein two symbols are coded in conjunction with one another, the coding table comprising 466 symbols grouped into 233 pairs so that, within each pair, one symbol is complementary to another one, to obtain the coding table comprising only 233 symbols such that no one symbol is complementary to another symbol; and a means for partitioning the obtained coding table comprising 233 symbols into three groups of symbols such that:

a first group comprises one symbol only, wherein all bits are the same;

a second group comprises symbols in which two least bits are the same;

a third groups comprises symbols in which the two least bits are opposite.

2. A coding apparatus according to claim 1, wherein the coding table is compiled so that the most significant bit (MSB) is "0".

3. A coding apparatus according to claim 1, wherein the input symbols are coded to have a minimum signal pulse width which is at least twice longer than one period of the receiver's sampling clock.

4. A coding apparatus according to claim 1, wherein the code table comprises 1 symbol in the first group, 143 symbols in the second group and 89 symbols in the third group.

5. A coding apparatus according to claim 1, wherein a code table is created wherein the order of symbols within each group is changed to optimise the amount of logic required, or for some other purposes.

6. A coding apparatus according to claim 1 wherein the code table is reordered to provide the optimal coder implementation such as having small or minimal logical terms.

7. A coding apparatus according to claim 1, implemented in hardware.

8. A coding apparatus according to claim 1 when used in a hub, a switch, router, modem, processor, CD or in a disc driver.

9. A method of coding data represented by 8 bit input symbols into 12 bit output codes for transmitting along a communication channel comprising a transmitter for serially transmitting codes represented in the channel by signals having a limited minimum and maximum pulse width and a receiver for sampling data at each clock period, wherein two input symbols, A and B, are encoded to have the minimum signal pulse width longer than one period of the receiver's sampling clock, into two output symbols, C and D, such that the symbol transmitted first is referred to as C and the symbol transmitted second is referred to as D, the method comprising the steps of:

generating a coding table wherein two symbols are coded in conjunction with one another, so that the coding table comprises 466 symbols grouped into 233 pairs and, within each pair, one symbol is complementary to another one, to obtain the coding table comprising only 233 symbols such that no one symbol is complementary to another symbol; and partitioning the obtained coding table comprising 233 symbols into three groups of symbols such that:

a first group comprises one symbol only, wherein all bits are the same;

a second group comprises symbols in which two least bits are the same;

a third groups comprises symbols in which the two least bits are opposite.

10. A method as claimed in claim 9, wherein the bits of symbol D are transmitted through the channel serially in the order opposite to the order of bits when transmitting symbol C.

11. A method as claimed in claim 9, wherein symbol C is taken from the first group or from the second group, and is followed by symbol D taken from the second group.

12. A method according to claim 9, wherein symbol C ends with two identical bits and symbol D starts with two identical bits.

13. A method according to claim 9, wherein if symbol A is greater or equal to 36, and symbol B is also greater or equal to 36, then:

symbol C is taken from the above described coding table under the number equal to A-35, while symbol D is taken from the same table under the number B-35;

the polarity of the first bit of the symbol D coinciding with the polarity of the last bit of symbol C so that there is no transition between symbols C and D.

14. A method according to claim 9, wherein if symbol A is less than 36, then:

symbol C is taken from the coding table under the number A×4+(B modulo 2), while symbol D is taken from the same table under the number B/2, so that symbol C is selected from the first or the second group only, and symbol D is also taken from the first or the second group only; and symbol D is transmitted complementary to symbol C selected from the table, so that there is a transition between symbols C and D.

15. A method according to claim 9, wherein if symbol A is greater or equal to 36, but symbol B is less than 36, then:

symbol C is taken from the coding table under the number B×4+(A modulo 2)+2; while symbol D is taken from the same table under the number A/2;

wherein symbol D is transmitted complementary to symbol C selected from the table, so that there is a transition between symbols C and D.

16. A method according to claim 9, wherein the obtained pairs C and D are further processed to avoid single bit interval pulse on the boundary of pairs.

17. A method according to claim 9, wherein, if the first bit of symbol C is opposite to the last bit of previously transmitted symbol D, the new symbols C and D are transmitted complementary.

18. A method according to claim 9, wherein if the two last bits in previous symbol D are the same, and the two first bits of the next symbol C are the same, then, the whole new pair C and D shall be transmitted complementary further.

19. The method as claimed in claim 9, further comprising a step of decoding output codes to obtain respective output symbols.

20. A communication apparatus for transmitting and receiving digital data, comprising:

a coder for coding data represented by input symbols into codes;

a transmitter for serially transmitting along a communication channel the codes represented in the channel by signals having a limited minimum and maximum pulse width; and a receiver for sampling data signals at each clock period, wherein the coder codes 8 bit input symbols into a 12 bit output codes to have the minimum signal pulse width longer than one period of the receiver's sampling clock, the coder further comprising:

a means for generating a coding table wherein two symbols are coded in conjunction with one another, the coding table comprising 466 symbols grouped into 233 pairs so that, within each pair, one symbol is complementary to another one, to obtain the coding table comprising only 233 symbols such that no one symbol is complementary to another symbol; and a means for partitioning the obtained coding table comprising 233 symbols into three groups of symbols, the first group comprising one symbol only, in which all bits are the same; the second group comprising symbols in which two least bits are the same; and the third group comprising symbols in which the two least bits are opposite.

\* \* \* \* \*